Sept. 13, 1955   C. A. RIGSBY   2,717,417
APPARATUS FOR MOLDING ELECTRICAL CONTACT BRUSHES
Filed April 13, 1951   5 Sheets-Sheet 1
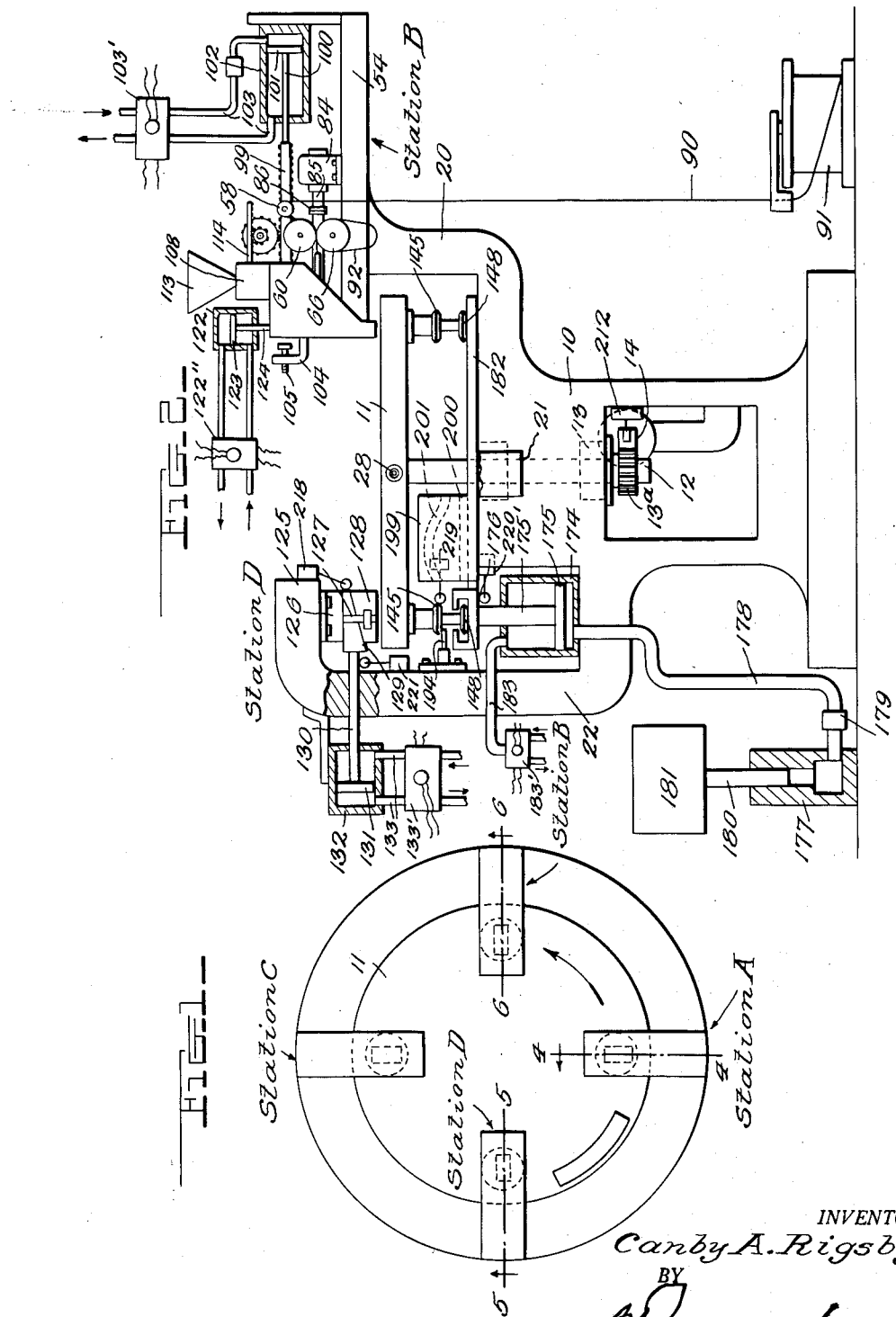
INVENTOR.
Canby A. Rigsby
BY
atty.

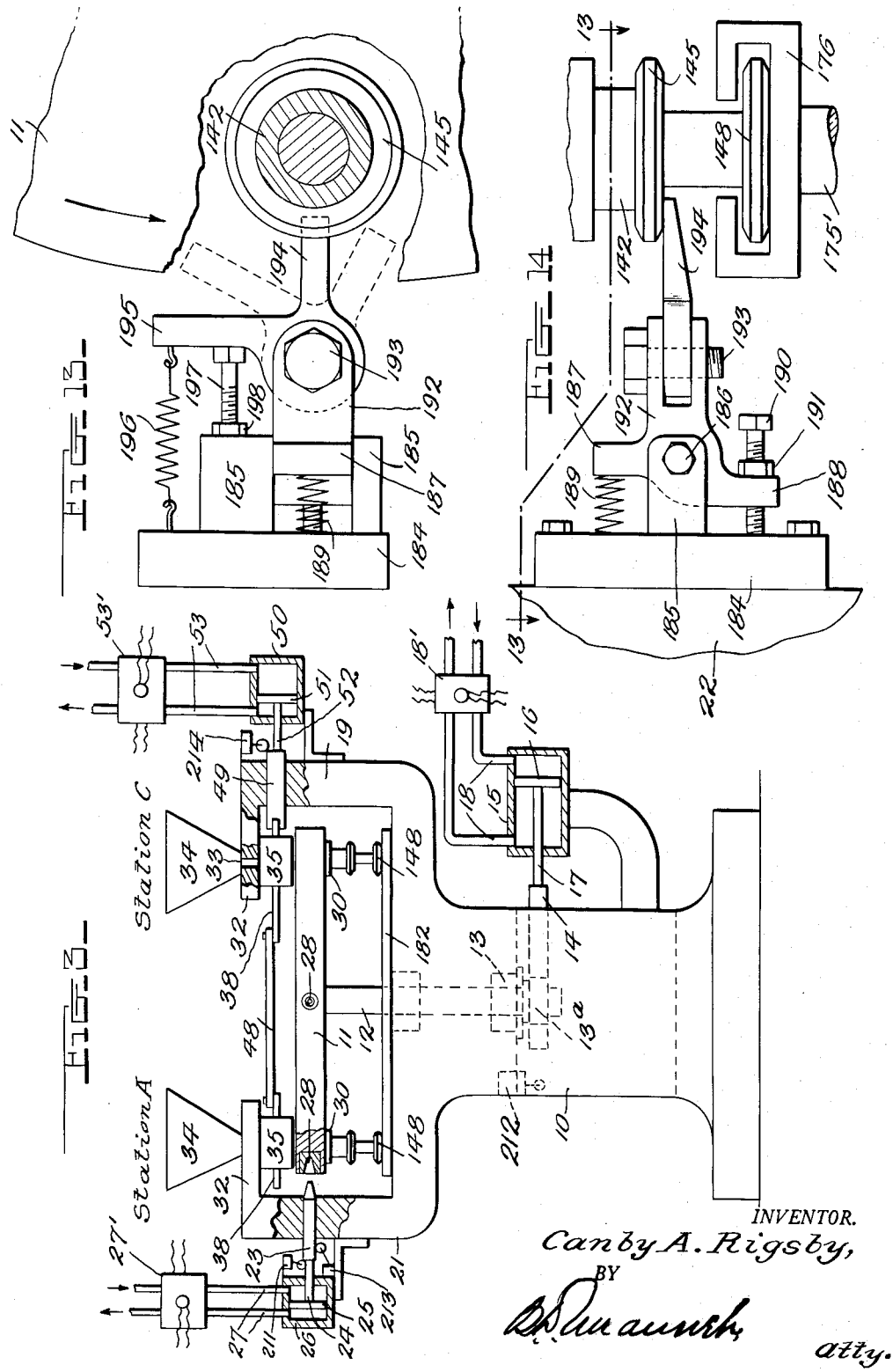

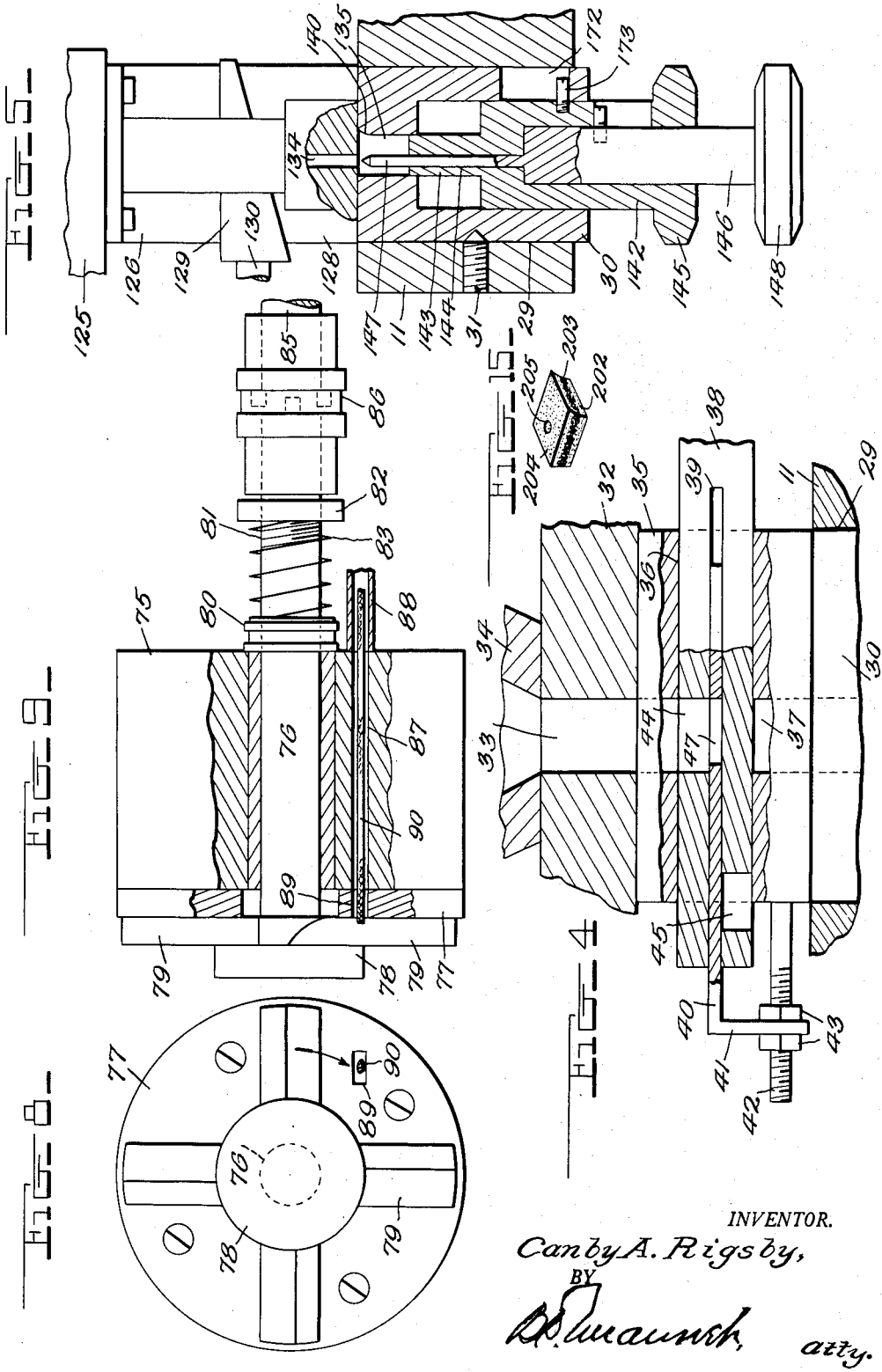

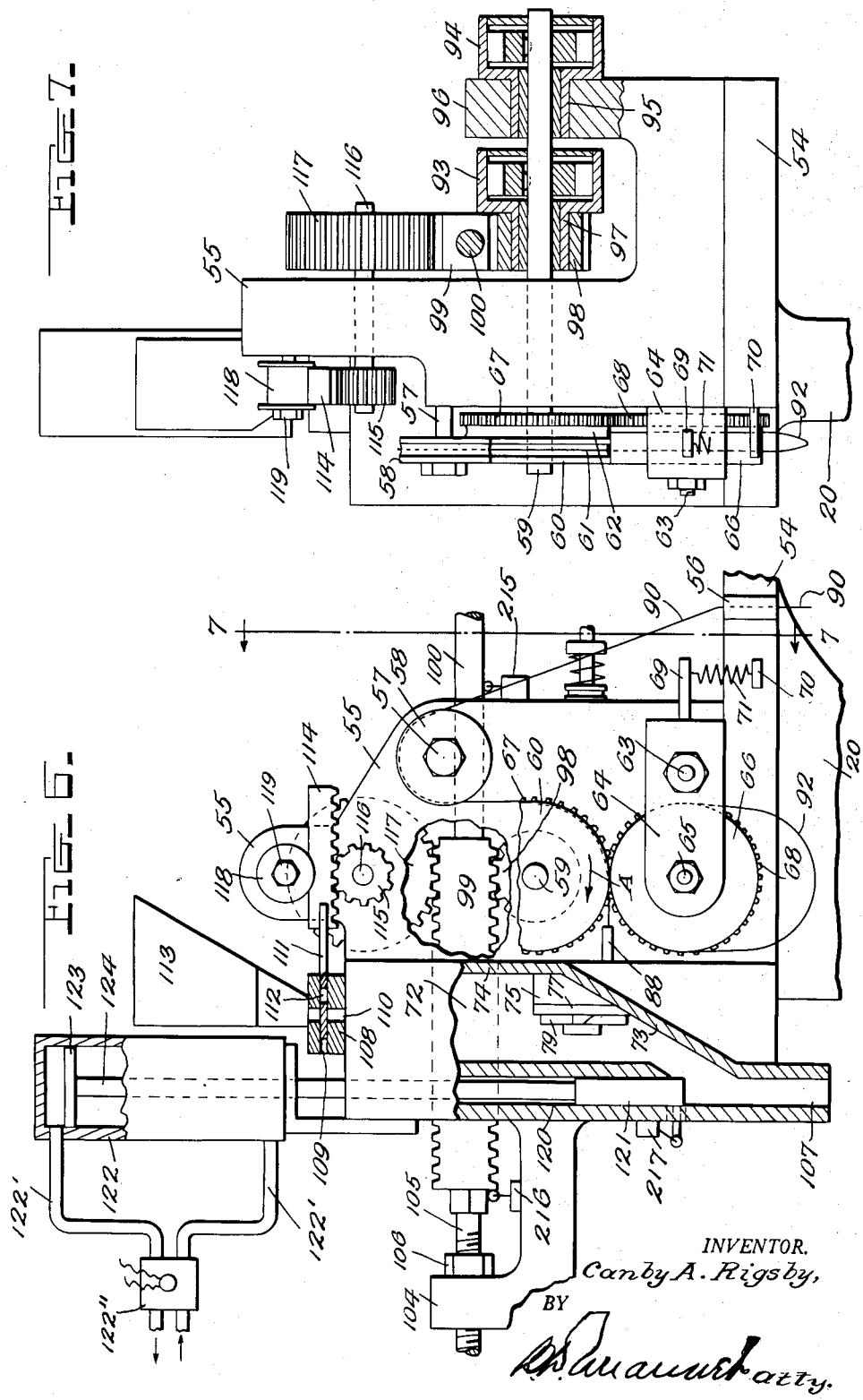

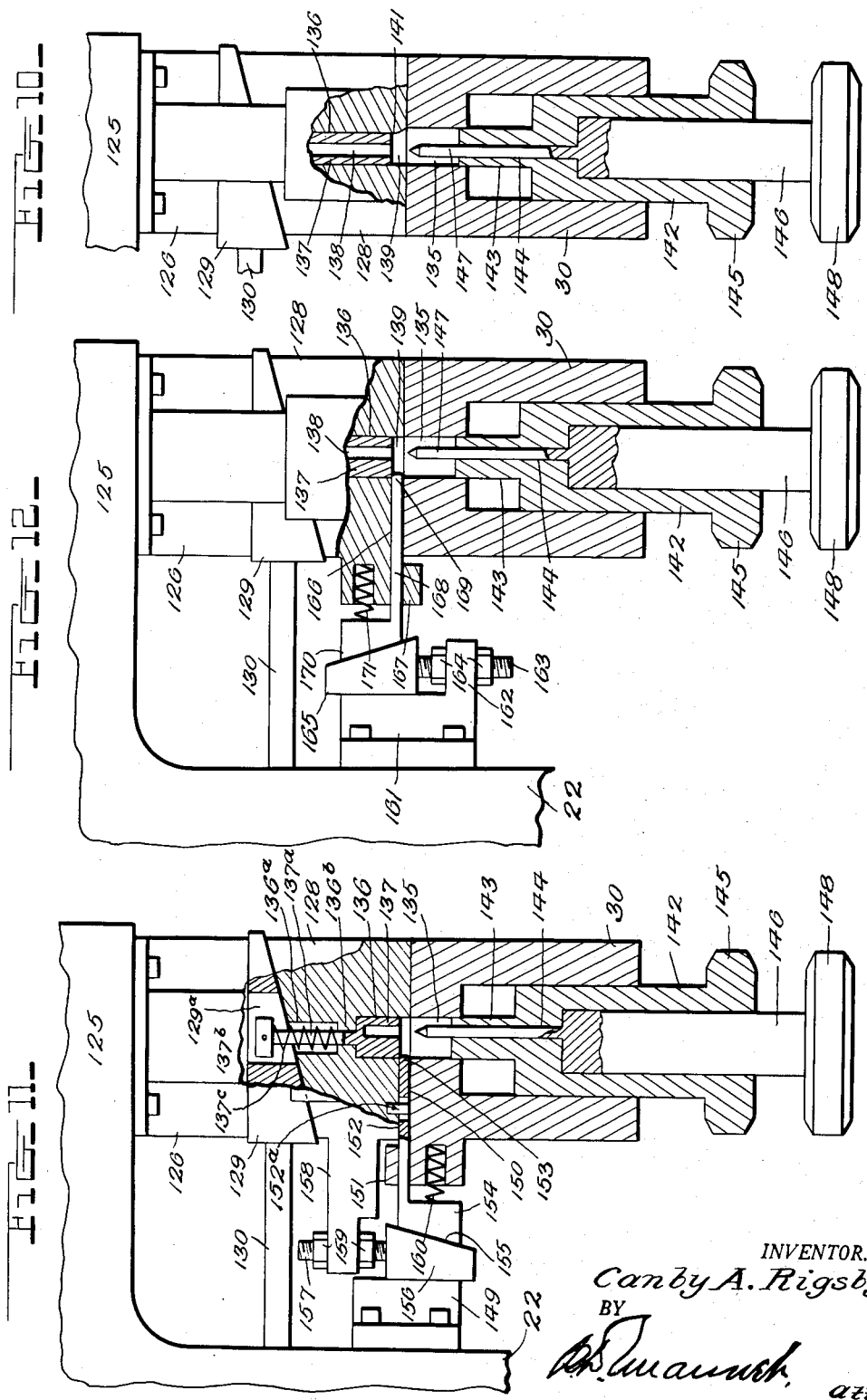

United States Patent Office 2,717,417
Patented Sept. 13, 1955

2,717,417

APPARATUS FOR MOLDING ELECTRICAL CONTACT BRUSHES

Canby A. Rigsby, Elwood, Ind.

Application April 13, 1951, Serial No. 221,299

4 Claims. (Cl. 18—5)

This invention relates to an apparatus for producing electrical contact brushes for conducting current from one of two relatively movable elements to the other such as the brushes used in connection with the commutators of motors and generators.

One important object of the invention is to provide a novel apparatus for performing automatically all of the operations necessary to produce completed brushes from the materials or ingredients used in forming the brushes, the apparatus operating with a minimum of manual assistance.

Another important object of this invention is to provide an apparatus for the foregoing purpose whereby the brushes produced will be of uniform dimensions, shape or contour, density and character and disposition of the various ingredients and whereby the brushes will be completely and uniformly finished upon delivery from the machine.

A further object of the invention is to provide means for molding such brushes under uniform pressures from accurately measured quantities of ingredients.

A still further object of the invention is to provide a machine for the above purpose which will effectively prepare such brushes in such manner that the brushes formed will be prepared for further treatment before use by then conveying the brushes automatically to and through a furnace or leer, preferably of electrically heated character, wherein the brushes are subjected to uniform heat treatments for uniform periods of time.

Yet another object of this invention is to provide a machine for molding an electric contact wherein practically all of the loss of raw materials due to hand operated methods is eliminated.

In the drawings, like characters of reference indicate like parts in the several views, and—

Fig. 1 is a diagrammatic view of the layout of four operating stations used in this invention.

Fig. 2 is a side elevation partly in section and showing the complete machine used herein.

Fig. 3 is a fragmentary elevation, partly in section, of the machine, the view being taken at right angles to Fig. 2.

Fig. 4 is an enlarged fragmentary section on the line 4—4 of Fig. 1.

Fig. 5 is an enlarged detail of the mold proper partly in section on the line 5—5 of Fig. 1.

Fig. 6 is an enlarged fragmentary view partly in elevation and partly in section on the line 6—6 of Fig. 1.

Fig. 7 is a section on the line 7—7 of Fig. 6.

Fig. 8 is a greatly enlarged detail of a certain wire cutter used herein.

Fig. 9 is a detail showing part of the drive for the wire cutter of Fig. 8.

Fig. 10 is a view similar to Fig. 5 but showing a modification of certain details in the formation of the mold cavity.

Fig. 11 is a view similar to Fig. 5 but showing a further modification of the mold cavity and the means for forming an edge wall thereof.

Fig. 12 is a still further modification of the arrangement shown in Fig. 11.

Fig. 13 is a fragmentary detail showing a holding device for maintaining a cam or inner cylinder used herein temporarily in raised position, being partly in section on the line 13—13 of Fig. 14.

Fig. 14 is a side elevation of the arrangement shown in Fig. 13.

Fig. 15 is a perspective view of the finished brush, being only one example of possible end products.

As here shown, the machine or apparatus has four operating stations A, B, C, and D at which certain steps in the molding of a brush are effected, these steps following each other in regular succession.

The machine is supported in general on a base 10 above the central part of which is positioned a turn-table 11 which is fixed on a vertical shaft 12 journalled in the base 10. On the shaft is mounted a clutch device 13 whereon is fixed a gear 13a wherewith meshes a rack 14. This clutch device is arranged to rotate the shaft 12 in the direction of the arrow of Fig. 1 when the rack 14 moves in one direction and releases connection between the gear 13a and shaft when the rack moves in the other direction.

Supported from the base 10 in alinement with the rack 14 is a cylinder 15 in which is a piston 16 connected to the rack 14 by a rod 17. This cylinder has a supply pipe 18 leading from each end and these pipes are connected to a timing valve (not shown) hereinafter frequently referred to. Carried by the base around the body of the base 10 are four equally spaced upstanding posts 19, 20, 21 and 22. Through the post 21 extends a slidable latching plunger 23 which is connected by a rod 24 with a piston 25 reciprocating in the cylinder 26. For producing timed movement, the cylinder 26 is connected by pipes 27 with the aforementioned timing valve. Around the turn-table are provided four sockets 28 uniformly circumferentially spaced. These sockets are engaged successively by the plunger 23 to latch the turn-table from movement in each of the four different positions of rotation. The turn-table 11 has, adjacent its periphery, four vertically drilled holes 29 wherein are fitted the outer mold cylinders 30. These cylinders have their upper ends in the proximity of the upper face of the table while their lower ends project somewhat below the under face of the turn-table. The cylinders 30 are secured in position by set screws 31 screwed in from the periphery of the turn-table and biting into the cylinders.

Now, referring especially to the construction at stations A and C, at these two stations each of the posts 19 and 21 has an arm 32 extending radially inward from the top of the post. Each of these arms has a passage 33 formed intermediate its ends. On top of the arm is fixed a hopper 34 and fixed to the under side of each arm is a block 35 forming a valve guide. Extending horizontally through the guide block in a direction radial to the axis of rotation of the turn-table is a passage 36 and leading downwardly through the block from the passage 33 is a passage 37 intersecting the passage 36. The passage 36 is flatly rectangular in cross-section and fitted slidably in this passage 36 is a slide valve 38. Extending inwardly from one end of the valve 38 is a slot 39 of rectangular cross-section wherein is slidably mounted a feed regulating slide 40. The slide 40 has a downturned end 41 through which extends a threaded rod 42 which is fixed at its inner end in the block 35. On the rod 42 is mounted a pair of nuts 43 between which extends the end 41. The valve 38 has a passage 44 leading down from its upper face to the slot 39 and from this a passage 45 leads to the under surface of said valve. The passages 44 and 45 are offset with respect to each other longitudinally of the valve. As the valve 38 is reciprocated the passages 44 move alternately into and out of registration with the passage 37. In the slide 40 is an opening 47 which lies between the upper and lower ends of the passage 37 and the size of the opening 47 determines the charge of material delivered at each reciprocation of the valve 38. The valves 38 of stations A and C are alined and a tie rod 48 has its ends pivoted (Fig. 3) to the adjacent ends of the valves. Through the post 19 extends a slide 49, one end of which is attached to the valve of the adjacent station. Alined with the slide 49 is a cylinder 50 having a piston 51 carrying a rod 52 connected with the slide 49. From the cylinder 50 extend pipes 53 which connect this cylinder to the before mentioned timing valve (not shown).

Considering now the construction peculiar to station B, at this station the top of the post 20 carries an integral platform 54 having an upstanding rib 55. Extending from the platform or base 54 is a vertical wire guide 56. Projecting from the rib 55 is a shaft 57 having a freely revolvable grooved wheel 58 mounted thereon with the plane of the groove alined with the axis of the wire guide. Journalled in the rib 55 is one end portion of a wire feed drive shaft 59 whereon is fixed an upper wire feed wheel 60 having a pair of laterally spaced grooves 61 and 62, the groove 61 being in planar alinement with the groove of wheel 58. Extending from the rib 55 is a pivot bolt 63 whereon is pivoted a yoke 64 between the arms of which extends a shaft 65. On the shaft 65 is revolvably mounted a flat faced wheel or pulley 66 which is in planar alinement with the wheel 60. Rotating with the wheel 60 is a gear 67 which meshes with a gear 68 carried by the wheel 66. In order to hold the wheels or pulleys 60 and 66 properly pressed together an arm 69 extends from the base of the yoke 64 and a bracket 70 extends from the edge of the platform 54. A coiled tension spring 71 connects the arm and bracket and urges the yoke to bias into proper position for effective spacing of the feed wheels 60 and 66. The rib 55 has the portion nearer the center of the machine laterally widened and provided with a vertical chamber 72 having a steeply inclined bottom wall 73. On the outer wall 74 and bottom 73 is formed a boss 75 and journalled in this boss is the forward end portion 76 of a cutter shaft (Figs. 8 and 9). On the inner face of the boss 75 is screwed a cutter plate 77 through the center of which extends the end portion of the shaft 76. On the extremity of this shaft is fixed a hub 78 from which radiates cutter blades 79 resting tightly against the plate 77. The shaft 76 extends outwardly through the boss 75 and wall 74 and passes through a thrust bearing 80. The outer end of the shaft 76 is threaded as at 81 and carries an adjusting nut 82 between which and the thrust bearing 80 is a coiled compression spring 83. By this means the spring is tensioned to keep the blades 79 tightly against the plate 77. Mounted on the platform 54 is a motor 84 having a shaft 85 which is connected to the shaft 76 by a flexible coupling 86. Through the boss 75 extends a wire passage 87 communicating at its outer end with a tubular wire guide 88 and at its inner end with an opening 89 wherethrough wire may project into the path of the blades 79.

For the purpose of this invention stranded wire cable or other suitable material 90 is led from a drum or reel 91 over the pulley 58 down to the wheel 60 to pass between the grooves 61 and wheel 66 then around the wheel 66 to depend in a loop 92. From the loop the wire passes upwardly over the outer segment of the wheel 66 to pass between this wheel and the groove 62 of the wheel 60. From there the wire passes through the guide 88 and passage 87 to project through the opening 89.

In order to provide a step-by-step movement of the wire through the opening 89, there is mounted on the shaft 59 a friction clutch 93 arranged to engage and drive the shaft, and consequently the wheel 60, in a clockwise direction as shown by the arrow A in Fig. 6, the clutch being freely revolvable on the shaft when rotated in the opposite direction. On the shaft 59 is also mounted a friction clutch 94 free from the shaft to permit movement in the clockwise direction but preventing movement in the opposite direction. The outer casing of the clutch 94 is provided with a boss 95 fixed in an upwardly projecting arm 96 formed on the rib 55. The clutch 93 has its outer member or casing provided with a boss 97 through which the shaft 59 passes and fixed on this boss is a gear 98. Resting on and meshing with this gear is a rack bar 99 having rack teeth extending along both the lower and the upper edges of the bar. Extending from the outer end of the bar 99 is a piston rod 100 carrying a piston 101 reciprocating in a cylinder 102 from opposite end portions of which pipes 103 lead to the before mentioned timing valve. Thus reciprocation of the piston effects step-by-step rotation of the shaft 59 and feeding of the wire 90. It is desirable to control the quantity of wire cut into short lengths by the blades 79 and to this end an arm 104 projects inwardly from the rib 55 and has an upturned end through which is screwed a threaded adjusting rod 105 which contacts the inner end of the rack bar 99. On the rod 105 is screwed a lock nut 106, the rod forming a stop for movement of the rack bar and thus limiting the extent of rotation of the shaft 59 and forward feed of the wire 90.

It is desired to cut a specified quantity of wire into specified lengths. The quantity of wire is controlled by the distance that rack gear 99 is allowed to travel and is regulated by lock nut 106, the length of the cut wire is controlled by the rate of feed through the constant speed cutter blades 79 (Fig. 8). The rate of feed is controlled by the flow of liquid, air or other gas to or from cylinders 102 and 122 through the control blow valve.

It will now be seen that that part of the invention best shown in Figs. 6 to 9 provides for the cutting of short lengths of wire which will drop onto the chamber bottom 73 and slide down the same to accumulate in a discharge tube 107. Obviously the wire scraps must be bonded together to properly enter into the formation of a brush of the type set forth. For the purpose of supplying bonding material to the wire scraps as each charge passes down the bottom, there is mounted on top of the chamber 72 a valve housing 108 having a horizontal slot 109 therein and a vertical opening on passage 110 intersecting the slot and extending through the housing. Reciprocably mounted in the slot 109 is a slide valve 111 having an opening 112 therethrough, the reciprocation of the valve causing this opening to move into and out of registry with the passage 110. A hopper 113 is mounted on top of the housing 108 and communicates with the upper end of the passage 110, the lower end of which opens into the chamber 72. This hopper contains binding material preferably pulverulent in character. The valve 111 is attached to a rack bar 114 which meshes with a gear 115 fixed on one end of a shaft 116 extending through the rib 55. On the other end of the shaft 116 is fixed a gear 117 which meshes with the upper rack teeth of the rack 99. Thus reciprocation of the rack 99 as above described also rack 114 causes reciprocation of the valve 111 and consequent discharge of a quantity of binding material for each bunch of wire cut off. A shrouded wheel 118 is carried on a stub shaft 119 and bears on the rack bar 114 to hold it in mesh with the gear 115.

The tube 107 is so positioned that each time the rotation of the turn-table 11 is arrested this tube will register with the upper end of a respective outer mold cylinder 30. Spaced above and alined with the tube 107 is a vertical guide tube 120 wherein slides a plunger 121. Above the guide tube is mounted a vertical cylinder 122 in which is a piston 123 connected to the plunger 121 by a rod 124. Supply tubes 122' extend from the cylinder to the timing valve before mentioned. The stroke of the piston is such that the downward movement of each reciprocation causes the plunger 121 to enter the tube 107 and expel the charge of wire and binder therein into the upper end of the mold cylinder 30.

Considering now certain of the particular arrangements at station D, at this place the post 22 has an arm 125 extending radially inward over the turn-table 11. On the under side of this arm is bolted an abutment block 126 having a horizontal under surface. From this block depends a pair of guide pins 127 between which is located an upper mold block or head 128 having an upper face inclined downwardly and outwardly from the under surface of the block 126. Between the adjacent surfaces of the block 126 and head 128 is a wedge 129 carried on the end of a piston rod 130 provided with a piston 131 reciprocating in a cylinder 132 suitably supported from the post 22. From the end portions of the cylinder 132 pipes 133 extend to the timing valve previously mentioned. The under surface of the mold head 128 normally lies close to the turn-table 11 but upon the piston being moved inwardly by the action of cylinder 132 the head is pushed tightly against the turn-table and closes the upper end of that outer mold cylinder 30 alined at the time beneath said head 128. In Figs. 5 and 11 a form of the mold cavity is shown wherein the head 128 has a flat under surface contacting, upon depression of the head with the turn-table 11 and mold cylinder 30. In this form a pin hole 134 extends upwardly from this bottom surface. In each of the forms the head of the cylinder 30 is provided with a bore 135. In the forms shown in Figs. 10 and 12 the head 128 is provided with a bore 136 wherein is fitted a bushing 137 wherein is formed a pin hole 138 corresponding to the pin hole 134 of the previously described forms. This bushing terminates downwardly above the level of the lower face of the head 128 and the cavity thus provided is the mold cavity. The bushing 137 constitutes also a brush ejecting ram movable vertically in the bore 136. As shown in Fig. 11 the mold block 128 also has a bore 136a opening through the upper surface of the mold block and separated from the bore 136 by a diaphragm 136b having a central perforation. The bushing or ram 137 has an integral pin 137a extending upwardly through the perforation in the diaphragm 136b and having a collar 137b pinned on its upper end. The wedge 129 has a slot 129a formed therein wherein the upper part of the pin 137a and its collar 137b are received. A coiled compression spring 137c surrounds the pin 137a and bears at its ends against the bottom of the bore 136a and the collar 137b. This spring normally holds the ram 137 against the diaphragm 136b and when the mold block 128 is in depressed position the collar 137b is spaced slightly below the under face of the abutment block 126. In the forms of Figs. 5 and 11 the mold cavity is simply the upper part of the bore 135. In the form of Fig. 5 one edge of the mold cavity is convex as at 140 and in the form shown in Fig. 10 the cavity edge is convex as at 141. The purpose of these convex edges is to provide a concave edge in the molded brush to obtain a better contact with an armature or the like.

Fitted within the outer cylinder in each of the forms shown is a downwardly opened inner cylinder 142 from the top of which extends a plunger 143 which fits closely in the bore 135. A pin hole 144 extends through the head of the cylinder 142 and plunger 143 in alinement with the pin hole of the respective mold head 128. The lower end of the cylinder 142 is provided with a tapered peripheral flange 145. Fitted in the cylinder 142 is a plunger 146 carrying a pin 147 which projects through the pin hole 144. The plunger 146 is provided at its lower end with a beveled peripheral flange 148. In the form of the mold shown in Figs. 11 and 12 special means are used for providing a concave edge on the brush. In Fig. 11 the post 22 has a bracket 149 bolted thereon and the bottom of the head 128 is radially grooved as at 150, a guide 151 being provided at the outer end of the groove. Through this guide and resting in the groove is a slide 152, the inner end of which forms one edge of the mold cavity and is rounded as at 153. A pin and slot arrangement 152a limits the movement of the slide. On the outer end of the slide 152 is a dependent head 154 having an inclined face 155 between which and the bracket 149 is located an adjustable wedge 156. To adjust the wedge it is provided with an upwardly extending screw 157 which passes slidably through an opening in an arm 158. Above and below the arm 158 nuts 159 are engaged on the screw 157. A spring 160 interposed between the cylinder 30 and head 154 holds the head against the wedge 156. By manipulating the nuts 159 the wedge is moved up or down until the desired position of the slide and rounded face 153 is attained. In the modification shown in Fig. 12 a bracket 161 is bolted to the post 22 and is provided at its lower end with an arm 162 projecting toward the turn-table 11. Through the arm 162 slidably passes a screw 163 carrying adjusting nuts 164 located on opposite sides of the arm. The screw 163 carries a wedge 165 the face of which bears against the face of the bracket 161. In the bottom of the head 128 is formed a groove 166, and the head carries a slotted guide 167. A slide 168 provided with a rounded edge 169 extends through the guide and along the groove to the mold chamber 139 to form one edge thereof. The slide 168 is provided with an upstanding head 170 held against the wedge 165 by a spring 171, the arrangement and adjustment thus being much like that of Fig. 11. In order to limit the downward movement of the inner cylinder 142 in the outer cylinder 30 a slot 172 (Fig. 5) is formed in the wall of the latter and a stop pin 173 projects from the cylinder 142 into this slot.

For the purpose of effecting compressive movement of ram or inner cylinder 142 and plunger 146 the following mechanism is provided at station D: A hydraulic cylinder 174 is mounted on the base 10 in alinement below the mold head 128. In this cylinder is a piston 175 provided with an upwardly extending rod 175' carrying a C-shaped yoke 176 at its upper end. The lower end of this cylinder is connected to an accumulator cylinder 177 by a pipe 178 provided with a regulating or balancing valve 179. Uniformity of pressure in the accumulator is maintained by the plunger 180 carrying the weight 181, the mass of which controls the pressure per square inch and which mass may be varied as desired. On the base is a fixed segmental table 182 whereon the lower ends of the plungers 146 normally slide except at station D, where the table is provided with a gap (not shown) for the yoke 176 which when lowered is at such height as to receive a plunger end as it moves into station D. From the upper end of the cylinder a pipe 183 leads to the timing valve 183' before referred to. The valve is so arranged that it may exhaust fluid from above the piston or apply fluid under pressure above the piston at such pressure as to overcome the pressure from the accumulator and hold the piston and yoke down. When a mold device is carried by the yoke pressure above the piston by the action of the timing valve above mentioned, the plunger 146 will be forced up until its upper end engages the top of the ram or inner cylinder 142. The plunger will continue to rise and the ram will be moved upwardly to compress the material in the mold chamber, the pin or needle 147 extending through the mold chamber to provide a hole in the brush. In order to hold the ram 142 raised temporarily while the pin is withdrawn certain latching means shown in Figs. 13 and 14 is provided. As there shown a bracket 184 is bolted to the post 22. This bracket is provided with a pair of arms 185 between which extends a pivot bolt 186. On this bolt is mounted a three armed spider, one arm 187 of which extends upwardly and a second arm 188 extends downwardly. Between the arm 187 and the base of the bracket is positioned a coiled compression spring 189 tending to bias the spider in a clockwise direction (Fig. 14). The arm 188 has a stop screw 190 screwed therethrough with its point normally in engagement with the bracket base 184. A jam nut 191 serves to secure the screw in adjusted position. The third arm 192 of the spider extends toward the center of the turn-table 11 and is bifurcated to provide a pair of vertically spaced arms between which extends a pivot bolt 193. On the bolt 193 is pivoted a bell crank lever having one arm 194 extending in the same direction as the arm 192. The other arm 195 of this bell crank extends normally parallel to the base of the bracket 184 and is urged to bias on the bolt 193 by a coiled tension spring 196 having its ends anchored respectively to the arm and the base of the bracket. A stop bolt 197 is screwed into an arm 185 in the path of the arm 195 to limit biasing of the bell crank in one direction, a jam nut 198 holding the stop bolt in adjusted position. In the operation of the latching means just described when a ram or inner cylinder 142 is raised by the operation of cylinder 174, the flange 145 will engage beneath the arm 194 and tilt the latch parts upward until the arm can pass over the edge of the flange whereupon the latch parts will return to the position shown in Fig. 14. The cylinder 174 now acts to draw the plunger 146 to lowered position. The next quarter revolution of the turn-table moves the lower mold parts, including the flange 145 in the direction of the arrow of Fig. 13. This will cause the arm 194 to swing laterally, by friction with flange 145, until the flange disengages. Then the arm 194 will be returned to normal position by the spring 196.

At 199 is a cam plate which is fixed on the table 182 and this plate has a lower groove 200 and an upper groove 201. The lower groove is alined with the flange 148 when the latter is in its lowest and normal position. The upper groove 201 has one end level with the flange 145 when the latter is supported on the arm 194 and its other end level with the flange 145 upon the latter being in normally lowered position. Between its ends the groove 201 is bowed upwardly. As the turn-table rotates to move the lower mold parts from station D to station A, the flanges 148 and 145 enter the respective grooves. During its passage through groove 201 the flange 145 moves the ram or inner cylinder 142 upward and thus expels the molded brush.

The brush as molded consists of three layers, a lower layer 202 formed from pulverulent material, a middle layer 203 formed of the same character of material mixed with short lengths of wire, and an upper layer 204 of like material, the pulverulent material being of a character solidifying under pressure so that the finished brush forms a rigid mass. The finished brush also has a bolt or screw hole 205 formed therethrough for an attaching screw or bolt whereby the brush may be affixed to the brush carrier of a motor or other electrical apparatus.

The operation of each mechanism forming this machine having been specifically described in detail, it is not deemed necessary to repeat such descriptions. However, it is thought advisable to summarize the several operations. To this end it will be noted that the hoppers 34 and 113 are provided with the desired pulverulent material. The motor 84 is started and the timing valve put in motion. The timing valve now causes operation of the cylinder 15 to effect rotation of the turn-table 11. At each quarter revolution of the turn-table the cylinder 26 operates to temporarily hold the turn-table stationary. As soon as the table stops, cylinders 50, 102 and 132 operate simultaneously immediately after which cylinder 174 operates through its complete cycle which terminates prior to the complete cycle of operation of cylinder 132. Also the cylinder 122 performs its complete cycle of operation between the end of the first half-cycle of operations of the cylinder 102 and the completion of the cycle of operation of the latter. The timed operation of the several cylinders has the following effects: At station A a charge of material for forming the first layer of the brush is deposited in the bore 135 on the upper end of the plunger 143. At station B a charge of mixed binder and wire scrap is first collected in the tube 107 and then pushed down on the layer previously deposited at station A. At station C the third or upper layer for the brush is deposited on the layer previously deposited at station B. The bore 125 now contains three layers in uncompressed conduit. At station D the three layers are solidly compressed and the hole 205 is formed. On passing from station D to station A the molded brush is expelled from the mold cavity. Obviously simultaneous action takes place at each station but each brush undergoes the same cycle of operations from the deposit of the first brush layer to the expulsion of the completed brush from the mold cavity. The expulsion of the brush from the mold after compression is effected as follows, reference being particularly had to the showing in Fig. 11.

It is to be understood that the apparatus may be used to produce any desired size and proportions of brush, it being merely necessary to proportion the mold parts and the material measuring valves to suit the particular brush to be made.

It is also to be understood that the invention is not limited as to the number of stations around the turn-table, four being herein shown and described as a convenient number only for describing the essential arrangement and method involved in this invention.

The prime numbers, such as 27′, used herein to designate control valves correspond to the numbers used to designate pipes connected to the various cylinders as shown on drawings.

When the main electrical switch is closed, motor 85 is started running continuously and at the same time the closing of the switch causes energization of a solenoid on control valve 27′ through a microswitch 221 causing the pressure in cylinder 26 to be shifted to the opposite side of piston 25, causing plunger 23 to be withdrawn from socket 28 thus unlocking turntable 11. At the end of the unlocking stroke of piston 25, plunger 23 operates a microswitch 211, closing an electrical circuit energizing a solenoid on control valve 18′, thus shifting the pressure in cylinder 15 to the opposite side of piston 16 causing rack gear 14 to move forward on gear 13, causing clutch 13 to rotate turntable 11 to the next station in the sequence.

At the end of forward stroke of piston 16, rack gear 14 operates microswitch 212, closing electrical circuit and energizing another solenoid on control valve 27′, thus shifting the pressure in cylinder 26 to the opposite side of piston 25, causing piston 25 and plunger 23 to return to normal position, thus locking turntable 11 in stationary position. At the end of the return stroke of piston 25 plunger 23 operates microswitch 213, closing an electrical circuit and energizing another solenoid on control valve 18′, thus shifting pressure in cylinder 15 to opposite side of piston 16, causing rack gear 14 and piston 16 to return to normal position, roller clutch (51) being released by backward motion of gear 13. Microswitch 213 also simultaneously closes electrical circuits to energize solenoids on control valves 53′, 103′ and 133′ for cylinders 50, 102 and 132 respectively, thus shifting the pressure to the opposite sides of pistons 51, 101 and 131 thus causing them to move forward simultaneously.

At the end of the forward stroke of piston 51, microswitch 214 is operated by slide 49, closing electrical circuit and energizing another solenoid on control valve 53′ causing pressure in cylinder 50 to be shifted to opposite side of piston 51, returning it to normal position.

At the end of the forward stroke of piston 101, rack gear 99 operates microswitch 216 (shown in Fig. 6) closing a second electrical circuit and thereby energizing a reversing solenoid on control valve 103′, causing pressure in cylinder 102 to be shifted to opposite side of piston 101 returning it and rack gear 99 to normal position. At the end of return stroke of piston 101, microswitch 216 (shown in Fig. 6) is operated by rack gear 99, closing electrical circuit and energizing solenoid on control valve 122" causing pressure in cylinder 122 to be shifted to opposite side of piston 123 causing piston 123 and plunger 121 to move downward. At the end of the downward stroke of piston 123, plunger 121 operates microswitch 217 (shown in Fig. 6) closing electrical circuit and energizing another solenoid on control valve 122" causing pressure in cylinder 122 to be shifted to opposite side of piston 123, returning it and plunger 121 to normal position.

At the end of the forward stroke of piston 131, micro switch 218 is operated by wedge 129, closing an electrical circuit and energizing solenoid on control valve 183' causing pressure above piston 175 in cylinder 174 to be released, thus allowing pressure in accumulator cylinder 177 to force piston 175 upwardly to compress the material in mold chamber. At or near the end of the upward stroke of piston 175, the upper end of yoke 176 operates micro switch 219 closing an electrical circuit to a delayed action timing relay which allows sufficient time for piston 175 to apply full accumulator pressure to the material in mold chamber before energizing another solenoid on control valve 183' which returns sufficient pressure to upper side of piston 175 to overcome accumulator pressure, thus returning piston 175 and yoke 176 to normal position. At the end of return stroke of piston 175 and yoke 176, yoke 176 operates micro switch 220, closing an electrical circuit and energizing another solenoid on control valve 133', causing pressure in cylinder 132 to be shifted to the opposite side of piston 131, thus causing piston 131 and wedge 129 to return to normal position. At the end of the return stroke of piston 131 and wedge 129, wedge 129 operates micro switch 221, closing an electrical circuit and energizing a solenoid on control valve 27', thus completing the cycle and automatically starting another cycle.

Having thus described the invention, what is claimed is:

1. In apparatus for the purpose described a base, a turn-table supported by said base to rotate on a vertical axis, sets of mold parts carried by said turn-table and positioned at equally spaced points on a circle concentric to said axis, pressure applying means and a series of containers for powdered material and having their axes alined with said circle, the pressure applying means equalling in number the sets of mold parts, each container having a valve controlling the flow of material from the containers, actuating means for said pressure applying means, table rotating means arranged to bring each set of mold parts successively into operative alinement with said container and actuating means, means to open and close said valves and actuate the actuating means in timed relation with the movements of the sets of mold parts, a chamber below one of said containers for receiving the powdered material and a cutter for stranded wire cable mounted in said chamber for comingling cut wire with the powdered material.

2. In apparatus for the purpose described a base, a turn-table supported by said base to rotate on a vertical axis, sets of mold parts carried by said turn-table and positioned at equally spaced points on a circle concentric to said axis, pressure applying means and a series of containers for powdered material and having their arms alined with said circle, the pressure applying means equalling in number the sets of mold parts, each container having a valve controlling the flow of material from the container, actuating means for said pressure applying means, table rotating means arranged to bring each set of mold parts successively into operative alinement with said container and actuating means, means to open and close said valves and actuate the actuating means in timed relation with the movement of the sets of mold parts, said table rotating means effecting step-by-step rotation of the table, means to temporarily hold said table from rotation at the end of each step, a chamber below one of said containers for receiving the powdered material and a cutter for stranded wire cable mounted in said chamber for comingling cut wire with the powdered material.

3. In apparatus for the purpose described a base, a turn-table supported by said base to rotate on a vertical axis, sets of mold parts carried by said turn-table and positioned at equally spaced points on a circle concentric to said axis, pressure applying means and a series of containers for powdered material and having their axes alined with said circle, the pressure applying means equalling in number the sets of mold parts, each container having a valve controlling the flow of material from the containers, actuating means for said pressure applying means, table rotating means arranged to bring each set of mold parts successively into operative alinement with said container and actuating means, means to open and close said valves and actuate the actuating means in timed relation with the movements of the sets of mold parts, a chamber below one of said containers for receiving the powdered material, a cutter for stranded wire cable mounted in said chamber for comingling cut wire with the powdered material, and a plunger acting to eject the powdered material and wires into successive sets of mold parts.

4. In apparatus for the purpose described a base, a turn-table supported by said base to rotate on a vertical axis, sets of mold parts carried by said turn-table and positioned at equally spaced points on a circle concentric to said axis, pressure applying means and a series of containers for powdered material and having their arms alined with said circle, the pressure applying means equalling in number the sets of mold parts, each container having a valve controlling the flow of material from the container, actuating means for said pressure applying means, table rotating means arranged to bring each set of mold parts successively into operative alinement with said container and actuating means, means to open and close said valves and actuate the actuating means in timed relation with the movement of the sets of mold parts, a chamber below one of said containers for receiving the powdered material, a cutter for stranded wire cable mounted in said chamber for comingling cut wire with the powdered material, and a plunger acting to eject the powdered material and wires into successive sets of mold parts.

References Cited in the file of this patent

UNITED STATES PATENTS

| | | |
|---|---|---|
| 1,600,445 | Woehr et al. | Sept. 21, 1926 |
| 1,728,273 | Hall | Sept. 17, 1929 |
| 1,831,144 | Shearer | Nov. 10, 1931 |
| 1,920,317 | Oexmann | Aug. 1, 1933 |
| 1,965,732 | Bisterfeld et al. | July 10, 1934 |
| 2,068,619 | Bailey | Jan. 19, 1937 |
| 2,155,316 | Lauterbach | Apr. 18, 1939 |
| 2,170,931 | Schafer | Aug. 29, 1939 |
| 2,449,008 | Pecker et al. | Sept. 7, 1948 |
| 2,528,509 | Goodrich | Nov. 7, 1950 |
| 2,621,363 | Fienberg et al. | Dec. 16, 1952 |
| 2,632,936 | Skipper et al. | Mar. 31, 1953 |